(12) United States Patent
Lai et al.

(10) Patent No.: US 12,507,420 B2
(45) Date of Patent: Dec. 23, 2025

(54) RESISTIVE MEMORY CELL AND ASSOCIATED CELL ARRAY STRUCTURE

(71) Applicant: eMemory Technology Inc., Hsin-chu (TW)

(72) Inventors: Tsung-Mu Lai, Hsinchu County (TW); Wei-Chen Chang, Hsinchu County (TW); Chun-Hung Lin, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 566 days.

(21) Appl. No.: 18/107,767

(22) Filed: Feb. 9, 2023

(65) Prior Publication Data

US 2023/0262994 A1 Aug. 17, 2023

Related U.S. Application Data

(60) Provisional application No. 63/309,022, filed on Feb. 11, 2022.

(51) Int. Cl.
*H10B 63/00* (2023.01)
*G11C 13/00* (2006.01)
*H10N 70/00* (2023.01)

(52) U.S. Cl.
CPC ......... *H10B 63/30* (2023.02); *G11C 13/0097* (2013.01); *H10N 70/883* (2023.02)

(58) Field of Classification Search
CPC .............................. H10B 63/30; G11C 2213/53
See application file for complete search history.

(56) References Cited

U.S. PATENT DOCUMENTS 7,532,496 B1 * 5/2009 Bu .................. G11C 17/16
365/150
9,178,000 B1 11/2015 Nardi
(Continued)

FOREIGN PATENT DOCUMENTS

JP 2009004441 A 1/2009
JP 2010055731 A 3/2010
(Continued)

OTHER PUBLICATIONS

Mei et al. "28-nm 2T High-K Metal Gate Embedded RRAM With Fully Compatible CMOS Logic Processes", Oct. 2013, IEEE.
(Continued)

*Primary Examiner* — Shih Tsun A Chou
(74) *Attorney, Agent, or Firm* — WPAT, PC

(57) ABSTRACT

A resistive memory cell includes a P-well region, an isolation structure, an N-well region, a first gate structure, a second gate structure, a first N-type doped region, a second N-type doped region, a third N-type doped region, a fourth N-type doped region, a word line, a bit line, a conductor line and a program line. The third N-type doped region, the fourth N-type doped region and the N-well region are collaboratively formed as an N-type merged region. The bit line is connected with the first N-type doped region. The word line is connected with a conductive layer of the first gate structure. The conductor line is connected with the second N-type doped region and a conductive layer of the second gate structure. The program line is connected with the N-type merged region.

13 Claims, 6 Drawing Sheets

(56) References Cited

U.S. PATENT DOCUMENTS 9,281,074 B2     3/2016   Wu
2013/0335875 A1   12/2013   Baumann

FOREIGN PATENT DOCUMENTS

JP           2012522328 A     9/2012
WO     WO2016048681 A1   3/2016

OTHER PUBLICATIONS

Hsieh et al. "A 14-nm FinFET Logic CMOS Process Compatible RRAM Flash With Excellent Immunity to Sneak Path", Dec. 2017, IEEE.
Office Action issued by JPO on Jun. 4, 2024.
Office Action issued by TIPO on Sep. 19, 2023.

\* cited by examiner

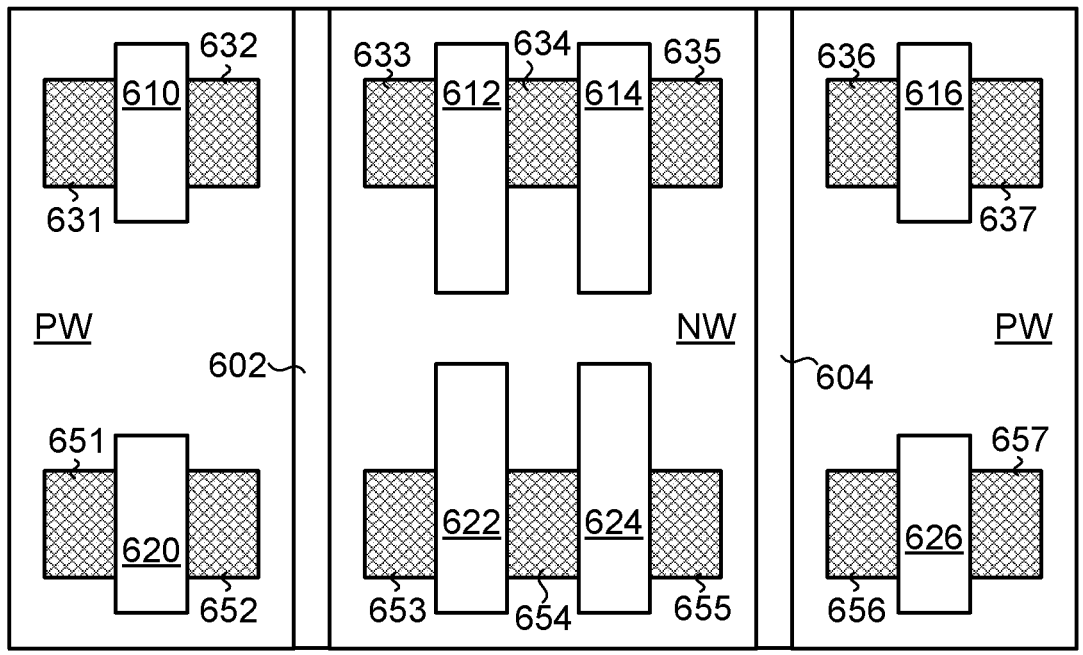
FIG. 6A
FIG. 6B
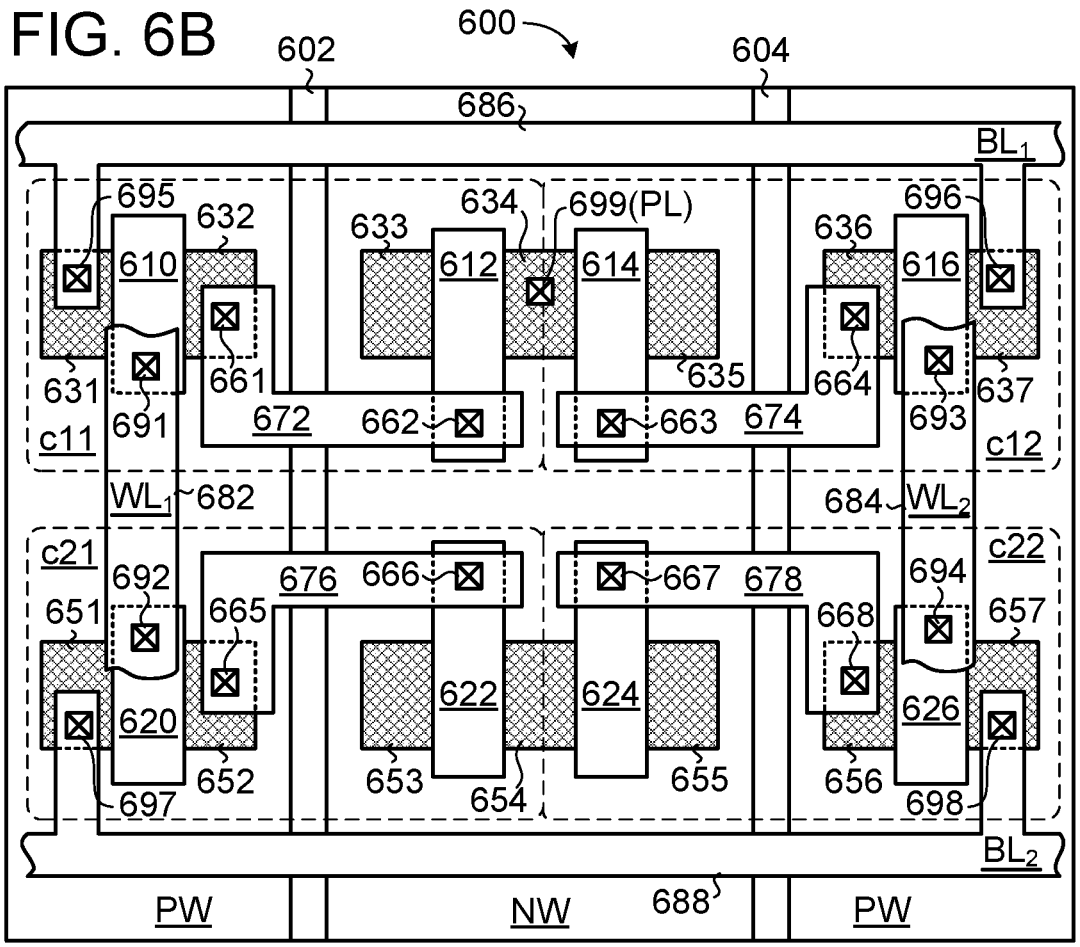

RESISTIVE MEMORY CELL AND ASSOCIATED CELL ARRAY STRUCTURE

This application claims the benefit of U.S. provisional application Ser. No. 63/309,022, filed Feb. 11, 2022, the subject matter of which is incorporated herein by reference.

FIELD OF THE INVENTION

The present invention relates to a memory cell of a memory, and more particularly to a resistive memory cell and an associated cell array structure.

BACKGROUND OF THE INVENTION

A resistive random-access memory (ReRAM) is one kind of non-volatile memory. The resistive random-access memory comprises plural resistive memory cells (ReRAM cells). Since the resistive random-access memories are manufactured with less processing steps and have faster writing speed, the resistive random-access memories are suitably used to replace the embedded flash memory in a system-on-chip (SOC).

FIG. 1 schematically illustrates the structure of a conventional resistive memory cell. As shown in FIG. 1, the resistive memory cell 100 comprises a bottom electrode 106, an insulation layer 104 and a top electrode 102, which are arranged in a stack form. After the resistive memory cell 100 is fabricated, the resistive memory cell 100 is in an initial state.

Before the resistive memory cell 100 is enabled, a forming action is performed to apply a first voltage Va and a second voltage Vb to the top electrode 102 and the bottom electrode 106, respectively. The voltage difference Vab between the first voltage Va and the second voltage Vb is a forming voltage, i.e., Vab=Va−Vb. When the top electrode 102 and the bottom electrode 106 receive the first voltage Va and the second voltage Vb, the cluster of oxygen vacancies in the insulation layer 104 forms a conducting filament 108. In addition, the conducting filament 108 is connected with the top electrode 102 and the bottom electrode 106.

After the resistive memory cell 100 undergoes the forming action, plural bias voltages lower than the forming voltage are provided to the resistive memory cell 100. Consequently, the state of the resistive memory cell 100 can be arbitrarily switched between a set state and a reset state. The resistive memory cell 100 in the set state has a lower resistance value. The resistive memory cell 100 in the reset state has a higher resistance value. The operations of the resistive memory cell 100 will be described as follows.

When the resistive memory cell 100 is in the set state corresponding to the lower resistance value, a reset action may be performed to switch the set state to the reset state corresponding to the higher resistance value. While the reset action is performed, a reset voltage is applied to the top electrode 102 and the bottom electrode 106. Meanwhile, the conducting filament 108 within the insulation layer 104 is treated by a redox process. Consequently, the conducting filament 108 is almost not connected between the top electrode 102 and the bottom electrode 106. In other words, after the reset action is completed, the region between the top electrode 102 and the bottom electrode 106 has the higher resistance value (i.e., in the reset state).

When the resistive memory cell 100 is in the reset state corresponding to the higher resistance value, the resistive memory cell 100 can be switched to the set state through a set action. While the set action is performed, a set voltage is applied to the top electrode 102 and the bottom electrode 106. Consequently, the conducting filament 108 within the insulation layer 104 can be well connected between the top electrode 102 and the bottom electrode 106. That is, after the set action is completed, the region between the top electrode 102 and the bottom electrode 106 has the lower resistance value (i.e., in the set state).

During a program cycle, in response to a program action, the resistive memory cell 100 can be selectively in the set state through the set action or in the reset state through the rest action. In other words, the set state and the reset state are two storage states of the resistive memory cell 100.

Generally, depending on the method of providing the set voltage and the reset voltage, the resistive memory cells are classified into two types, i.e., the resistive memory cell in a unipolar operation mode and the resistive memory cell in a bipolar operation mode. In case that the resistive memory cell 100 is in the unipolar operation mode, the set action and the reset action are respectively performed on the resistive memory cell 100 according to two positive voltage differences Vab, or the set action and the reset action are respectively performed on the resistive memory cell 100 according to two negative voltage differences Vab. In case that the resistive memory cell 100 is in the bipolar operation mode, the set action is performed on the resistive memory cell 100 according to a positive voltage difference Vab and the reset action are performed on the resistive memory cell 100 according to a negative voltage difference Vab; or the set action is performed on the resistive memory cell 100 according to a negative voltage difference Vab, and the reset action is performed on the resistive memory cell 100 according to a positive voltage difference Vab. The positive voltage difference indicates that the first voltage Va is higher than the second voltage Vb and the first voltage Va minus the second voltage Vb is positive, i.e., Vab=Va−Vb>0. The negative voltage difference indicates that the first voltage Va is lower than the second voltage Vb and the first voltage Va minus the second voltage Vb is negative, i.e., Vab=Va−Vb<0.

FIG. 2A schematically illustrates the relationship between the current and the voltage when a set action and a reset action are performed on the resistive memory cell in a unipolar operation mode. FIG. 2B schematically illustrates the relationship between the current and the voltage when a set action and a reset action are performed on the resistive memory cell in a bipolar operation mode.

The dotted curve as shown in FIG. 2A indicates that the resistive memory cell 100 is originally in the reset state. By providing a set voltage of about 1.88V, the magnitude of the current flowing through the resistive memory cell 100 rises. Since the resistance of the resistive memory cell 100 decreases, the resistive memory cell 100 is switched to the set state. The solid curve as shown in FIG. 2A indicates that the resistive memory cell 100 is originally in the set state. By providing a reset voltage of about 1.78V, the magnitude of the current flowing through the resistive memory cell 100 drops. Since the resistance of the resistive memory cell 100 increases, the resistive memory cell 100 is switched to the reset state. In other words, as shown in FIG. 2A, the resistive memory cell 100 is in the unipolar operation mode. The set action and the reset action are respectively performed on the resistive memory cell 100 according to two positive voltage differences Vab (i.e., 1.78V and 1.88V).

The dotted curve as shown in FIG. 2B indicates that the resistive memory cell 100 is originally in the reset state. By providing a set voltage of about −2.4V, the magnitude of the current flowing through the resistive memory cell 100 rises. Since the resistance of the resistive memory cell 100 decreases, the resistive memory cell 100 is switched to the set state. The solid curve as shown in FIG. 2B indicates that the resistive memory cell 100 is originally in the set state. By providing a reset voltage higher than about 1.5V, the magnitude of the current flowing through the resistive memory cell 100 drops. Since the resistance of the resistive memory cell 100 increases, the resistive memory cell 100 is switched to the reset state. In other words, as shown in FIG. 2B, the resistive memory cell 100 is in the bipolar operation mode. The set action and the reset action are respectively performed on the resistive memory cell 100 according to one positive voltage difference Vab (i.e., 1.5V) and one negative voltage difference (i.e., −2.4V).

SUMMARY OF THE INVENTION

An embodiment of the present invention provides a cell array structure. The cell array structure includes a first resistive memory cell. The first resistive memory cell includes a semiconductor substrate, a first-type well region, a first isolation structure, a second-type well region, a first gate structure, a second gate structure, a first second-type doped region, a second second-type doped region, a third second-type doped region, a fourth second-type doped region, a first conductor line, a second conductor line, a third conductor line and a fourth conductor line. The first-type well region is formed under a surface of the semiconductor substrate. The first isolation structure is formed in the first-type well region. The second-type well region is formed in the first-type well region. The second-type well region is located beside a first side of the first isolation structure. The first gate structure is formed over a surface of the first-type well region and located beside a second side of the first isolation structure. The second gate structure is formed over a surface of the second-type well region. The first second-type doped region and the second second-type doped region are formed in the first-type well region. The first second-type doped region and the second second-type doped region are located beside two opposite sides of the first gate structure. The third second-type doped region and the fourth second-type doped region are formed in the second-type well region. The third second-type doped region and the fourth second-type doped region are located beside two opposite sides of the second gate structure. The third second-type doped region, the fourth second-type doped region and the second-type well region are collaboratively formed as a second-type merged region. The first conductor line is connected with the first second-type doped region. The second conductor line is connected with a conductive layer of the first gate structure. The third conductor line is connected with the second second-type doped region and a conductive layer of the second gate structure. The fourth conductor line is connected with the second-type merged region.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 6A and 6B are schematic top views illustrating a process of manufacturing a cell array structure with plural resistive memory cells of the second embodiment;

DETAILED DESCRIPTION OF PREFERRED EMBODIMENTS

Figure 1:
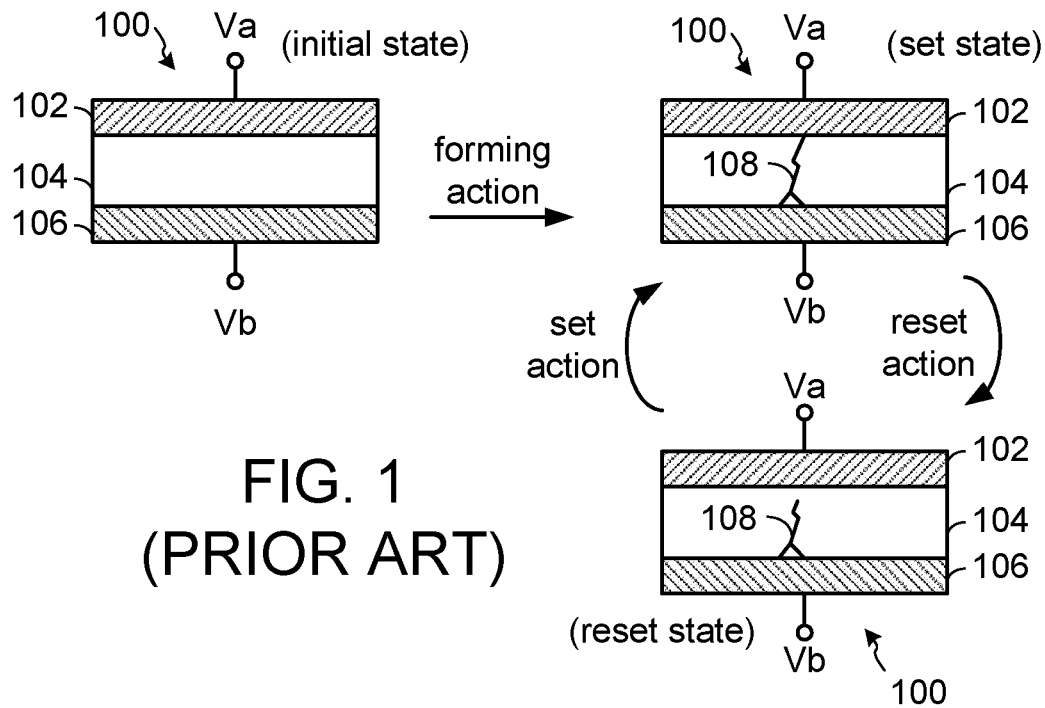
FIG. 1 (prior art) is a schematic circuit block diagram illustrating the architecture of a conventional non-volatile memory for an electronic device.
Figure 2A:
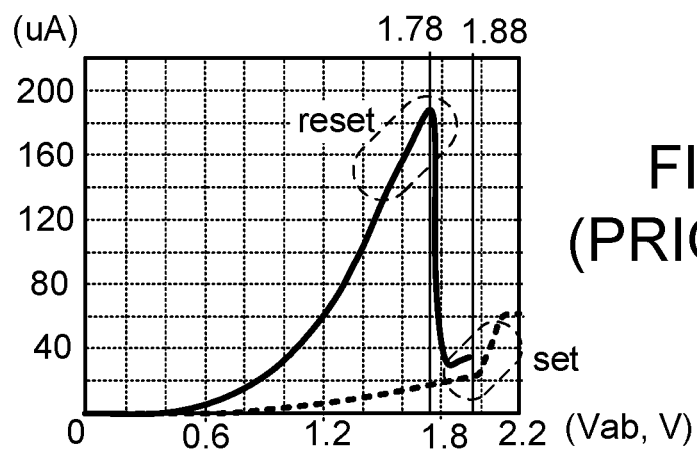
FIG. 2A (prior art) schematically illustrates the relationship between the current and the voltage when a set action and a reset action are performed on the resistive memory cell in a unipolar operation mode.
Figure 2B:
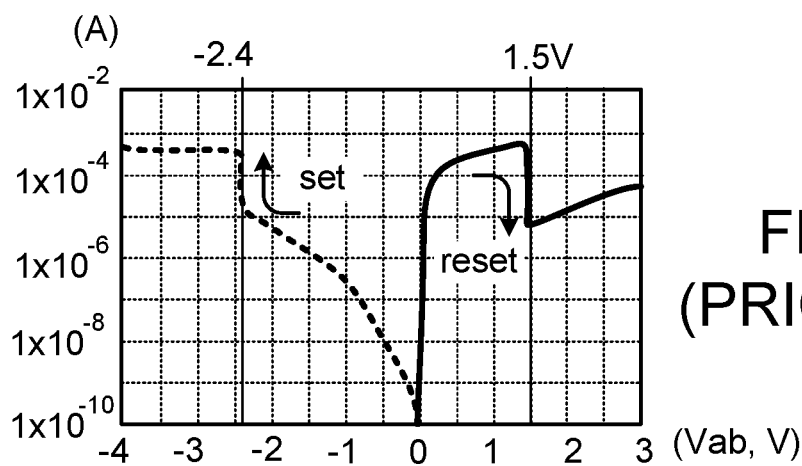
FIG. 2B (prior art) schematically illustrates the relationship between the current and the voltage when a set action and a reset action are performed on the resistive memory cell in a bipolar operation mode.
Figure 3A:
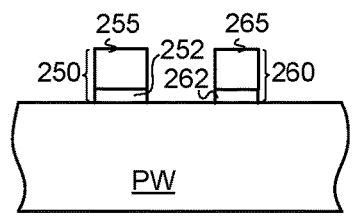
FIGS. 3A, 3B and 3C are schematic cross-sectional views illustrating a process of manufacturing a resistive memory cell according to a first embodiment of the present invention.
Figure 3B:
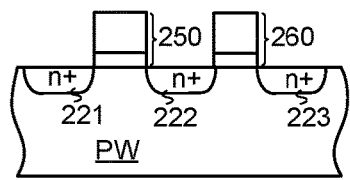
Figure 3C:
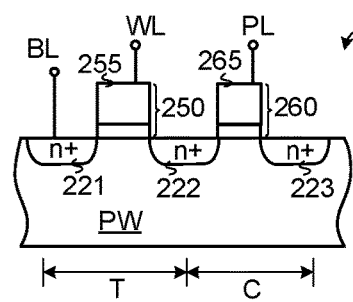
Figure 3D:
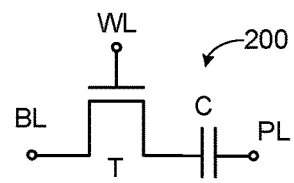
FIG. 3D is a schematic equivalent circuit diagram of the resistive memory cell according to the first embodiment of the present invention.

FIGS. 3A, 3B and 3C are schematic cross-sectional views illustrating a process of manufacturing a resistive memory cell according to a first embodiment of the present invention. FIG. 3D is a schematic equivalent circuit diagram of the resistive memory cell according to the first embodiment of the present invention.

Please refer to FIG. 3A. Firstly, two gate structures 250 and 260 are formed over the surface of a P-type well region PW in a semiconductor substrate (not shown).

The first gate structure 250 comprises an insulation layer 252 and a conductive layer 255. The second gate structure 260 comprises an insulation layer 262 and a conductive layer 265. The insulation layer 252 of the first gate structure 250 is located over the surface of the P-type well region PW. Moreover, the conductive layer 255 is located over the insulation layer 252. Similarly, the insulation layer 262 of the second gate structure 260 is located over the surface of the P-type well region PW. Moreover, the conductive layer 265 is located over the insulation layer 262.

In this embodiment, each of the insulation layer 262 and the conductive layer 265 of the second gate structure 260 is a stack structure with plural material layers. For example, the insulation layer 262 is a stack structure with a silicon dioxide layer ($SiO_2$) and a hafnium dioxide layer ($HfO_2$), and the conductive layer 265 is a stack structure with a titanium layer (Ti), a titanium nitride layer (TiN) and a tungsten layer (W). The hafnium dioxide layer ($HfO_2$) is a high dielectric constant (high-k) material layer, which is suitable for the resistive memory. The silicon dioxide layer ($SiO_2$) is located over the surface of the P-type well region PW. The hafnium dioxide layer ($HfO_2$) is located over the silicon dioxide layer ($SiO_2$). The titanium layer (Ti) is located over the hafnium dioxide layer ($HfO_2$). The titanium layer (TiN) is located over the titanium layer (Ti). The tungsten layer (W) is located over the titanium nitride layer (TiN).

It is noted that the examples of the material layers of the gate structure are not restricted. That is, the material layers may be modified. For example, in another embodiment, the high high-k material layer in the insulation layer 262 is replaced by a tantalum oxide layer ($Ta_2O_5$). Alternatively, the conductive layer 265 is a stack structure with a titanium layer (Ti) and a tungsten layer (W).

Please refer to FIG. 3B. After an implantation process is performed, a first doped region 221, a second doped region 222 and a third doped region 223 are formed under the exposed surface of the P-type well region PW. The first doped region 221, the second doped region 222 and the third doped region 223 are N-type doped regions (n+). The first doped region 221 and the second doped region 222 are located beside two opposite sides of the first gate structure 250. The second doped region 222 and the third doped region 223 are located beside two opposite sides of the second gate structure 260.

Please refer to FIG. 3C. Then, a connection process is performed. That is, a first conductor line is connected with the first doped region 221, a second conductor line is connected with the conductive layer 255 of the first gate structure 250, and a third conductor line is connected with the conductive layer 265 of the second gate structure 260. Consequently, the resistive memory cell 200 is produced. The first conductor line is a bit line BL of the resistive memory cell 200. The second conductor line is a word line WL of the resistive memory cell 200. The third conductor line is a program line PL of the resistive memory cell 200.

Please refer to FIG. 3C again. In the P-type well region PW, the first doped region 221, the second doped region 222 and the first gate structure 250 are collaboratively formed as a transistor T. Moreover, the second doped region 222, the third doped region 223 and the second gate structure 260 are collaboratively formed as a capacitor C. Consequently, the resistive memory cell 200 can be referred as a 1T1C cell.

Please refer to FIG. 3D. The resistive memory cell 200 comprises a transistor T and a capacitor C. The first drain/source terminal of the transistor T is connected with the bit line BL. The gate terminal of the transistor T is connected with the word line WL. Moreover, the first terminal of the capacitor C is connected with the second drain/source terminal of the transistor T, and the second terminal of the capacitor C is connected with the program line PL.

Figure 4:
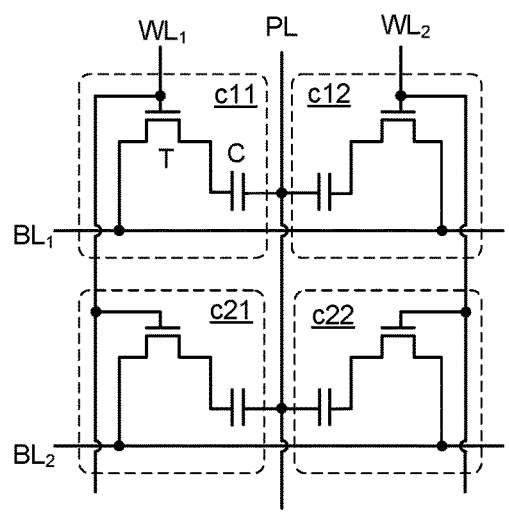
FIG. 4 is a schematic equivalent circuit diagram illustrating a cell array structure with plural resistive memory cells of the first embodiment.

Moreover, plural resistive memory cells can be combined as a cell array structure. FIG. 4 is a schematic equivalent circuit diagram illustrating a cell array structure with plural resistive memory cells of the first embodiment. The cell array structure 300 comprises m×n resistive memory cells, wherein m and n are positive integers. For illustration, the cell array structure 300 of this embodiment comprises 2×2 resistive memory cells c11~c22. Each of the resistive memory cells c11~c22 has the structure as shown in FIGS. 3C and 3D.

Please refer to the cell array structure 300 of FIG. 4. Both of two resistive memory cells c11 and c21 in the first column are connected with a word line $WL_1$ and a program line PL. Moreover, the two resistive memory cells c11 and c21 in the first column are connected with the corresponding bit lines $BL_1$ and $BL_2$, respectively. Moreover, both of the two resistive memory cells c12 and c22 in the second column are connected with a word line $WL_2$ and the program line PL. Moreover, the two resistive memory cells c12 and c22 in the second column are connected with the corresponding bit lines $BL_1$ and $BL_2$, respectively.

By providing proper bias voltages to the word lines $WL_1$~$WL_2$, the program line PL and the bit lines $BL_1$~$BL_2$ of the cell array structure 300, a forming action, a reset action, a set action or a read action can be selectively performed on any of the resistive memory cells c11~c22. For example, after the resistive memory cell c11 undergoes the forming action, a conducting filament is formed in the insulation layer of the capacitor C. After the resistive memory cell c11 undergoes the set action, the conducting filament is connected between the first terminal and the second terminal of the capacitor C. After the resistive memory cell c11 undergoes the reset action, the conducting filament is not connected between the first terminal and the second terminal of the capacitor C.

FIGS. 5A, 5B, 5C and 5D are schematic cross-sectional views illustrating a process of manufacturing a resistive memory cell according to a second embodiment of the present invention. FIG. 5E is a schematic equivalent circuit diagram of the resistive memory cell according to the second embodiment of the present invention. In comparison with the first embodiment, the program line of the resistive memory cell of the second embodiment is directly connected with an N-type merged region. In the first embodiment, the conductive layer 260 of the second gate structure 260 receives the voltage from the program line PL. Whereas, in the second embodiment, the N-type merged region receives the voltage from the program line PL.

Figure 5A:
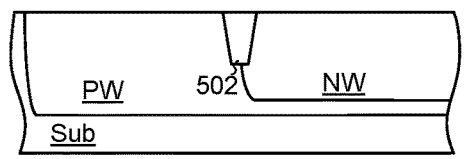
FIGS. 5A, 5B, 5C and 5D are schematic cross-sectional views illustrating a process of manufacturing a resistive memory cell according to a second embodiment of the present invention.

Please refer to FIG. 5A. Firstly, a P-type well region PW is formed on a semiconductor substrate Sub, and an isolation structure 502 is formed in the P-type well region PW. Then, an N-type well region NW is formed in the P-type well region PW and located beside a first side of the isolation structure 502. For example, the isolation structure 502 is a shallow trench isolation structure (STI).

Figure 5B:
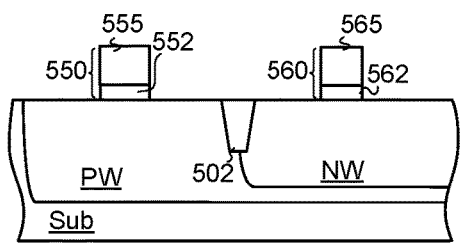
Figure 5C:
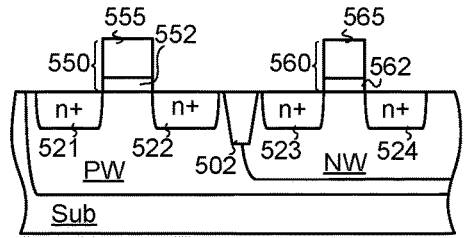

Please refer to FIG. 5B. Then, a first gate structure 550 is formed over the surface of the P-type well region PW beside a second side of the isolation structure 502, and a second gate structure 560 is formed over the surface of the N-type well region NW beside the first side of the isolation structure 502. The first gate structure 550 comprises an insulation layer 552 and a conductive layer 555. The second gate structure 560 comprises an insulation layer 562 and a conductive layer 565. The insulation layer 552 of the first gate structure 550 is located over the surface of the P-type well region PW, and the conductive layer 555 is located over the insulation layer 552. Similarly, the insulation layer 562 of the second gate structure 560 is located over the surface of the N-type well region NW, and the conductive layer 565 is located over the insulation layer 562.

In this embodiment, each of the insulation layer 562 and the conductive layer 565 of the second gate structure 560 is a stack structure with plural material layers. For example, the insulation layer 562 is a stack structure with a silicon dioxide layer ($SiO_2$) and a hafnium dioxide layer ($HfO_2$), and the conductive layer 565 is a stack structure with a titanium layer (Ti), a titanium nitride layer (TiN) and a tungsten layer (W). The hafnium dioxide layer ($HfO_2$) is a high dielectric constant (high-k) material layer, which is suitable for the resistive memory. The silicon dioxide layer ($SiO_2$) is located over the surface of the N-type well region NW. The hafnium dioxide layer ($HfO_2$) is located over the silicon dioxide layer ($SiO_2$). The titanium layer (Ti) is located over the hafnium dioxide layer ($HfO_2$). The titanium layer (TiN) is located over the titanium layer (Ti). The tungsten layer (W) is located over the titanium nitride layer (TiN).

It is noted that the examples of the material layers of the gate structure are not restricted. That is, the material layers may be modified. For example, in another embodiment, the high high-k material layer in the insulation layer 562 is replaced by a tantalum oxide layer ($Ta_2O_5$). Alternatively, the conductive layer 565 is a stack structure with a titanium layer (Ti) and a tungsten layer (W).

After an implantation process is performed, a first doped region 521 and a second doped region 522 are formed under the exposed surface of the P-type well region PW, and a third doped region 523 and a fourth doped region 524 are formed in the exposed surface of the N-type well region NW. The first doped region 521 and the second doped region 522 are N-type doped regions (n+). Moreover, the first doped region 521 and the second doped region 522 are located beside two opposite sides of the first gate structure 550. The third doped region 523 and the fourth doped region 524 are N-type doped regions (n+). Moreover, the third doped region 523 and the fourth doped region 524 are located beside two opposite sides of the second gate structure 560. That is, the first gate structure 550 is formed over the surface of the P-well region PW between the first doped region 521 and the second doped region 522, and the second gate structure 560 is formed over the surface of the N-type well region NW between the third doped region 523 and the fourth doped region 524.

Figure 5D:
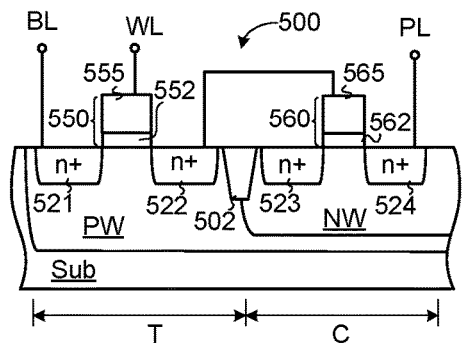
Figure 5E:
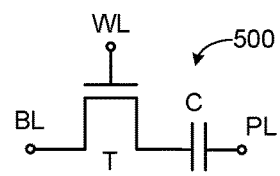
FIG. 5E is a schematic equivalent circuit diagram of the resistive memory cell according to the second embodiment of the present invention.

Please refer to FIG. 5D. Then, a connection process is performed. That is, a first conductor line is connected with the first doped region 521, a second conductor line is connected with the conductive layer 555 of the first gate structure 550, a third conductor line is connected with the second doped region 522 and the conductive layer 565 of the second gate structure 560, and a fourth conductor line is connected with the fourth doped region 524. Consequently, the resistive memory cell 500 is produced. The first conductor line is a bit line BL of the resistive memory cell 500. The second conductor line is a word line WL of the resistive memory cell 500. The fourth conductor line is a program line PL of the resistive memory cell 500.

Please refer to FIG. 5D again. In the P-type well region PW, the first doped region 521, the second doped region 522 and the first gate structure 550 are collaboratively formed as a transistor T. Since the third doped region 523, the fourth doped region 524 and the N-type well region NW are N-type semiconductors, the third doped region 523 and the fourth doped region 524 and the N-type well region NW are electrically connected with each other and formed as an N-type merged region. In other words, the N-type merged region and the second gate structure 560 are formed as a capacitor C. Since the resistive memory cell 500 comprises one transistor and one capacitor, the resistive memory cell 500 can be referred as a 1T1C cell. Moreover, the transistor T is an N-type transistor, the capacitor C is an N-type MOS capacitor, and the program line PL is directly connected with the N-type merged region.

As shown in FIG. 5D, the program line PL is connected with the fourth doped region 524. It is noted that numerous modifications and alterations may be made while retaining the teachings of the invention. For example, in some other embodiments, the program line PL is connected with the third doped region 523, or the program line PL is connected with the N-type well region NW. Consequently, the purpose of connecting the program line PL with the N-type merged region can be achieved.

Please refer to FIG. 5E. The resistive memory cell 500 comprises a transistor T and a capacitor C. The first drain/source terminal of the transistor T is connected with the bit line BL. The gate terminal of the transistor T is connected with the word line WL. Moreover, the first terminal of the capacitor C is connected with the second drain/source terminal of the transistor T, and the second terminal of the capacitor C is connected with the program line PL.

Figure 6C:
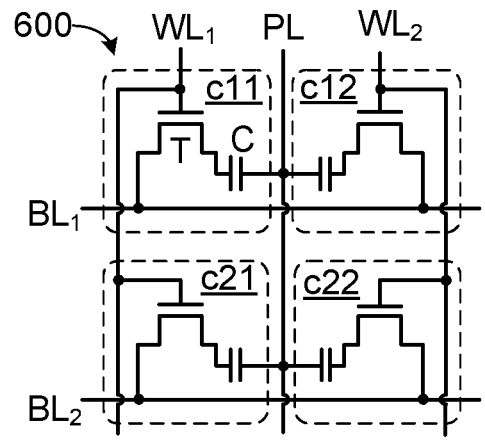
FIG. 6C is a schematic equivalent circuit diagram of the cell array structure with plural resistive memory cells according to the second embodiment of the present invention.

Moreover, plural resistive memory cells can be combined as a cell array structure. FIGS. 6A and 6B are schematic top views illustrating a process of manufacturing a cell array structure with plural resistive memory cells of the second embodiment. FIG. 6C is a schematic equivalent circuit diagram of the cell array structure with plural resistive memory cells according to the second embodiment of the present invention. The cell array structure 600 comprises m×n resistive memory cells, wherein m and n are positive integers. For illustration, the cell array structure 600 of this embodiment comprises 2×2 resistive memory cells c11~c22.

Please refer to FIG. 6A. Firstly, a P-type well region PW is formed in a semiconductor substrate Sub (not shown), and isolation structures 602 and 604 are formed in the P-type well region PW. Then, an N-type well region NW is formed in the P-type well region PW and arranged between the isolation structures 602 and 604. Moreover, the isolation structures 602 and 604 are shallow trench isolation structures (STI).

Then, plural gate structures 612, 614, 622 and 624 are formed over the surface the N-type well region NW between the first side of the isolation structure 602 and the first side of the isolation structure 606. Moreover, two gate structures 610 and 620 are formed over the surface of P-type well region PW beside the second side of the isolation structure 602. Moreover, two gate structures 616 and 626 are formed over the surface of the P-type well region PW beside the second side of the isolation structure 604. Similarly, each of the gate structures 610, 612, 614, 616, 620, 622, 624 and 626 comprises an insulation layer and a conductive layer.

After an implantation process is performed, plural N-type (n+) doped regions 631~637 and 651~657 are formed. The doped regions 631 and 632 are formed in the P-type well region PW and located beside two opposite sides of the gate structure 610. The doped regions 636 and 637 are formed in the P-type well region PW and located beside two opposite sides of the gate structure 616. The doped regions 651 and 652 are formed in the P-type well region PW and located beside two opposite sides of the gate structure 620. The doped regions 656 and 657 are formed in the P-type well region PW and located beside two opposite sides of the gate structure 626. The doped regions 633, 634 and 635 are formed in the N-type well region NW. The doped region 633 is located beside the first side of the gate structure 612. The doped region 634 is arranged between the second side of the gate structure 612 and the first side of the gate structure 614. The doped region 635 is located beside the second side of the gate structure 614. The doped regions 653, 654 and 655 are formed in the N-type well region NW. The doped region 653 is located beside the first side of the gate structure 622. The doped region 654 is arranged between the second side of the gate structure 622 and the first side of the gate structure 624. The doped region 655 is located beside the second side of the gate structure 624.

Then, a connection process is performed. Consequently, the cell array structure 600 is produced. Please refer to FIG. 6B. Then, the conductor lines 672, 674, 676, 678, 682, 684, 686 and 688 are formed on a metal layer. The conductor line 672 is connected with the doped region 632 through the contact hole 661, and the conductor line 672 is connected with the conductive layer of the gate structure 612 through the contact hole 662. The conductor line 674 is connected with the doped region 636 through the contact hole 664, and the conductor line 674 is connected with the conductive layer of the gate structure 614 through the contact hole 663. The conductor line 676 is connected with the doped region 652 through the contact hole 665, and the conductor line 676 is connected with the conductive layer of the gate structure 622 through the contact hole 666. The conductor line 678 is connected with the doped region 656 through the contact hole 668, and the conductor line 678 is connected with the conductive layer of the gate structure 624 through the contact hole 667.

The conductor line 682 is connected with conductive layer of the gate structure 610 through the contact hole 691, and the conductor line 682 is connected with the conductive layer of the gate structure 620 through the contact hole 692. In addition, the conductor line 682 is used as a word line $WL_1$. The conductor line 684 is connected with conductive layer of the gate structure 616 through the contact hole 693, and the conductor line 684 is connected with the conductive layer of the gate structure 626 through the contact hole 694. In addition, the conductor line 684 is used as a word line $WL_2$. The conductor line 686 is connected with the doped region 631 through the contact hole 695, and the conductor line 686 is connected with the doped region 637 through the contact hole 696. In addition, the conductor line 686 is used as a bit line $BL_1$. The conductor line 688 is connected with the doped region 651 through the contact hole 697, and the conductor line 688 is connected with the doped region 657 through the contact hole 698. In addition, the conductor line 688 is used as a bit line BL2.

The metal layer further comprises an additional conductor line (not shown), and the conductor line is used as a program line PL. The program line PL is connected with the doped region 634 through the contact hole 699.

As shown in FIG. 6B, the cell array structure 600 comprises 2×2 resistive memory cells c11~c22. The structure of the resistive memory cell c11 is similar to the structure of the resistive memory cell in FIG. 5D, and not redundantly described herein.

In the cell array structure 600, the N-type well region NW and the doped regions 633~635 and 653~655 are N-type semiconductors. Consequently, the N-type well region and the doped regions 633~635 and 653~655 are electrically connected with each other and collaboratively formed as an N-type merged region. In other words, the N-type merged region of the cell array structure 600 receives the voltage from the program line PL.

Please refer to the cell array structure 600 of FIG. 6C. Both of two resistive memory cells c11 and c21 in the first column are connected with a word line $WL_1$ and a program line PL. Moreover, the two resistive memory cells c11 and c21 in the first column are connected with the corresponding bit lines $BL_1$ and $BL_2$, respectively. Moreover, both of the two resistive memory cells c12 and c22 in the second column are connected with a word line $WL_2$ and the program line PL. Moreover, the two resistive memory cells c12 and c22 in the second column are connected with the corresponding bit lines $BL_1$ and $BL_2$, respectively.

By providing proper bias voltages to the word lines $WL_1$~$WL_2$, the program line PL and the bit lines $BL_1$~$BL_2$ of the cell array structure 600, a forming action, a reset action, a set action or a read action can be selectively performed on any of the resistive memory cells c11~c22. Thee associated operations will be described as follows.

Figure 7A:
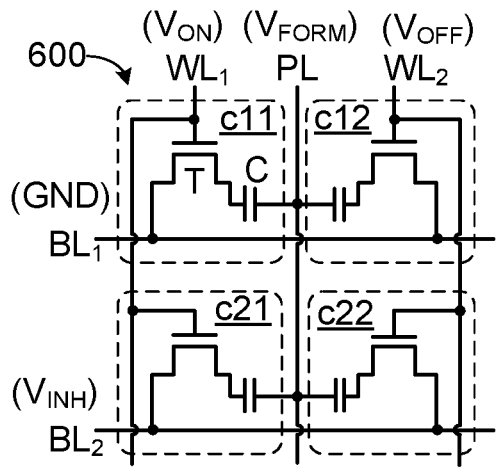
FIG. 7A schematically illustrates the bias voltages for performing a forming action on the cell array structure in the unipolar operation mode.
Figure 7B:
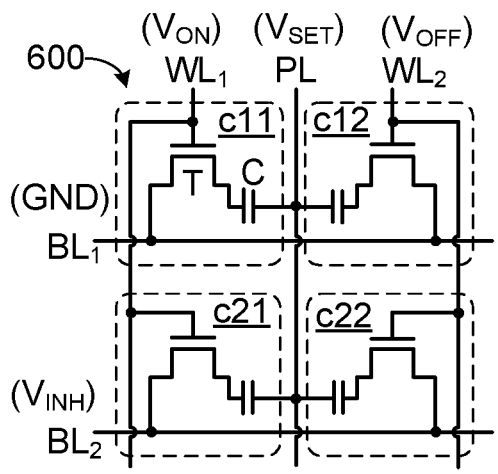
FIG. 7B schematically illustrates the bias voltages for performing a set action on the cell array structure in the unipolar operation mode.
Figure 7C:
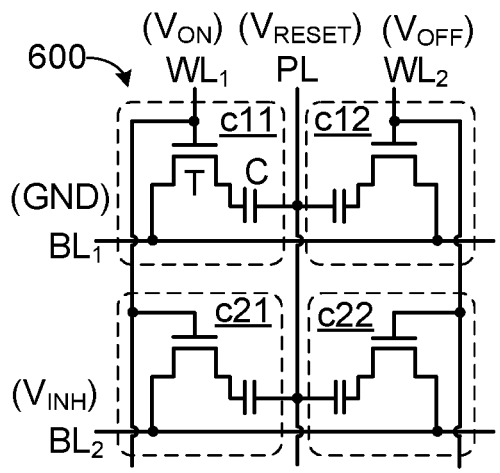
FIG. 7C schematically illustrates the bias voltages for performing a reset action on the cell array structure in the unipolar operation mode.
Figure 7D:
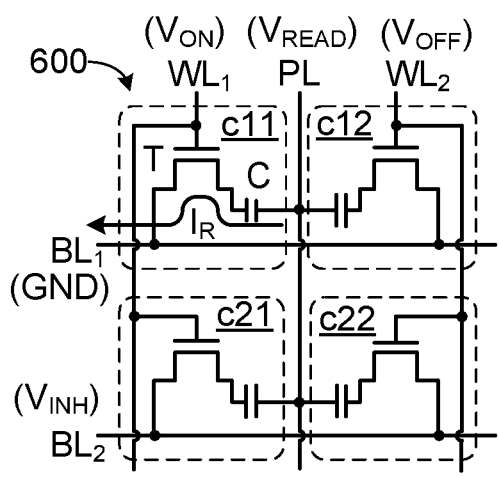
FIG. 7D schematically illustrates the bias voltages for performing a read action on the cell array structure in the unipolar operation mode.

FIG. 7A schematically illustrates the bias voltages for performing a forming action on the cell array structure in the unipolar operation mode. FIG. 7B schematically illustrates the bias voltages for performing a set action on the cell array structure in the unipolar operation mode. FIG. 7C schematically illustrates the bias voltages for performing a reset action on the cell array structure in the unipolar operation mode. FIG. 7D schematically illustrates the bias voltages for performing a read action on the cell array structure in the unipolar operation mode. For illustration, the resistive memory cell c11 is taken as the example of a selected memory cell.

Please refer to FIG. 7A. When the forming action is performed, the word line $WL_1$ receives an on voltage $V_{ON}$, the word line $WL_2$ receives an off voltage $V_{OFF}$, the program line PL receives a forming voltage $V_{FORM}$, the bit line $BL_1$ receives a ground voltage GND, and the bit line $BL_2$ receives an inhibit voltage $V_{INH}$. Consequently, the resistive memory cell c11 is the selected memory cell, and the other resistive memory cell c12, c21 and c22 are the unselected memory cells. The magnitude of the forming voltage $V_{FORM}$ is higher than the magnitude of the on voltage $V_{ON}$. The magnitude of the on voltage $V_{ON}$ is higher than the magnitude of the ground voltage GND. The magnitude of the inhibit voltage $V_{INH}$ is higher than the magnitude of the ground voltage GND.

In the unselected memory cells c12 and c22 of the cell array structure 600, the transistors receive the off voltage $V_{OFF}$, and thus the transistors are turned off. Consequently, the unselected memory cells c12 and c22 cannot undergo the forming action. In the unselected memory cell c21 of the cell array structure 600, the transistor is turned on. However, the voltage difference between the two terminals of the capacitor C (i.e., $V_{FORM}$–$V_{INH}$) is lower than the magnitude of the forming voltage $V_{FORM}$. Consequently, the unselected memory cell c21 cannot undergo the forming action.

In the selected memory cell c11 of the cell array structure 600, the transistor T receives the on voltage $V_{ON}$, and thus the transistor T is turned on. In addition, the voltage difference between the two terminals of the capacitor C is equal to the forming voltage $V_{FORM}$. Consequently, a conducting filament is formed in the insulation layer of the capacitor C. Meanwhile, the forming action is completed.

Please refer to FIG. 7B. When the set action is performed, the word line $WL_1$ receives the on voltage $V_{ON}$, the word line $WL_2$ receives the off voltage $V_{OFF}$, the program line PL receives a set voltage $V_{SET}$, the bit line $BL_1$ receives the ground voltage GND, and the bit line BL2 receives the inhibit voltage $V_{INH}$. Consequently, the resistive memory cell c11 is the selected memory cell, and the other resistive memory cell c12, c21 and c22 are the unselected memory cells. The magnitude of the forming voltage $V_{FORM}$ is higher than the magnitude of the set voltage $V_{SET}$. The magnitude of the set voltage $V_{SET}$ is higher than the magnitude of the on voltage $V_{ON}$. The magnitude of the inhibit voltage $V_{INH}$ is higher than the magnitude of the on voltage $V_{ON}$.

In the unselected memory cells c12 and c22 of the cell array structure 600, the transistors receive the off voltage $V_{OFF}$, and thus the transistors are turned off. Consequently, the unselected memory cells c12 and c22 cannot undergo the set action. In the unselected memory cell c21 of the cell array structure 600, the transistor is turned on. However, the voltage difference between the two terminals of the capacitor C (i.e., $V_{SET}-V_{INH}$) is lower than the magnitude of the set voltage $V_{SET}$. Consequently, the unselected memory cell c21 cannot undergo the set action.

In the selected memory cell c11 of the cell array structure 600, the transistor T receives the on voltage $V_{ON}$, and thus the transistor T is turned on. In addition, the voltage difference between the two terminals of the capacitor C is equal to the set voltage $V_{SET}$. Consequently, the conducting filament in the insulation layer of the capacitor C is connected with the two terminals of the capacitor C. Meanwhile, the set action is completed.

Please refer to FIG. 7C. When the reset action is performed, the word line $WL_1$ receives the on voltage $V_{ON}$, the word line $WL_2$ receives the off voltage $V_{OFF}$, the program line PL receives the reset voltage $V_{RESET}$, the bit line $BL_1$ receives the ground voltage GND, and the bit line $BL_2$ receives the inhibit voltage $V_{INH}$. Consequently, the resistive memory cell c11 is the selected memory cell, and the other resistive memory cell c12, c21 and c22 are the unselected memory cells. The magnitude of the set voltage $V_{SET}$ is higher than the magnitude of the reset voltage $V_{RESET}$. The magnitude of the reset voltage $V_{RESET}$ is higher than the magnitude of the on voltage VON. The magnitude of the inhibit voltage $V_{INH}$ is higher than the magnitude of the on voltage $V_{ON}$.

In the unselected memory cells c12 and c22 of the cell array structure 600, the transistors receives the off voltage $V_{OFF}$, and thus the transistors are turned off. Consequently, the unselected memory cells c12 and c22 cannot undergo the reset action. In the unselected memory cell c21 of the cell array structure 600, the transistor is turned on. However, the voltage difference between the two terminals of the capacitor C (i.e., $V_{RESET}-V_{INH}$) is lower than the magnitude of the reset voltage $V_{RESET}$. Consequently, the unselected memory cell c21 cannot undergo the reset action.

In the selected memory cell c11 of the cell array structure 600, the transistor T receives the on voltage $V_{ON}$, and thus the transistor T is turned on. In addition, the voltage difference between the two terminals of the capacitor C is equal to the reset voltage $V_{RESET}$. Consequently, the conducting filament in the insulation layer of the capacitor C is not connected with the two terminals of the capacitor C. Meanwhile, the reset action is completed.

Please refer to FIG. 7D. When the read action is performed, th word line $WL_1$ receives the on voltage $V_{ON}$, the word line $WL_2$ receives the off voltage $V_{OFF}$, the program line PL receives a read voltage $V_{READ}$, the bit line $BL_1$ receives the ground voltage GND, and the bit line $BL_2$ receives the inhibit voltage $V_{INH}$. Consequently, the resistive memory cell c11 is the selected memory cell, and the other resistive memory cell c12, c21 and c22 are the unselected memory cells. The magnitude of the read voltage $V_{READ}$ is lower than the magnitude of the reset voltage $V_{RESET}$. The magnitude of the read voltage $V_{READ}$ is higher than the magnitude of the ground voltage GND.

In the unselected memory cells c12 and c22 of the cell array structure 600, the transistors receive the off voltage $V_{OFF}$, and thus the transistors are turned off. Consequently, no read currents are generated by the unselected memory cells c12 and c22. In the unselected memory cell c21 of the cell array structure 600, the transistor is turned on. However, the voltage difference between the two terminals of the capacitor C (i.e., $V_{READ}-V_{INH}$) is very low. Consequently, no read current is generated by the unselected memory cell c21.

In the selected memory cell c11 of the cell array structure 600, the transistor T receives the on voltage $V_{ON}$, and thus the transistor T is turned on. In addition, the voltage difference between the two terminals of the capacitor C is equal to the read voltage $V_{READ}$. Consequently, the selected memory cell generates a read current IR to the bit line $BL_1$. Moreover, the storage state of the selected memory cell c11 is determined according to the magnitude of the read current IR.

Figure 8A:
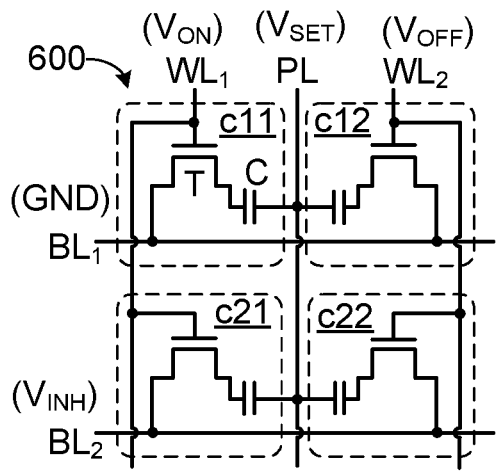
FIG. 8A schematically illustrates the bias voltages for performing a set action on the cell array structure in the bipolar operation mode.
Figure 8B:
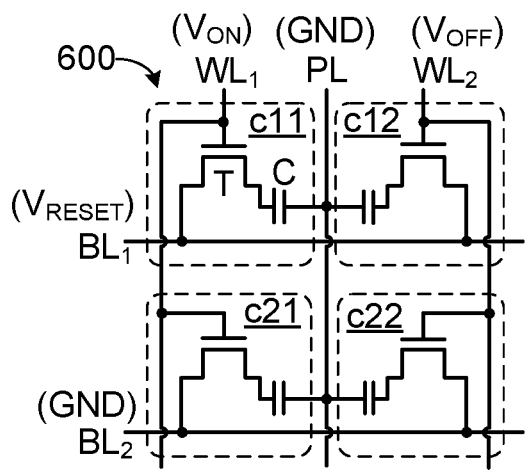
FIG. 8B schematically illustrates the bias voltages for performing a reset action on the cell array structure in the bipolar operation mode.

FIG. 8A schematically illustrates the bias voltages for performing a set action on the cell array structure in the bipolar operation mode. FIG. 8B schematically illustrates the bias voltages for performing a reset action on the cell array structure in the bipolar operation mode. The operations for performing the forming action and the read action on the cell array structure in the bipolar operation mode are similar to those of FIGS. 7A and 7D, and not redundantly described herein. For illustration, the resistive memory cell c11 is taken as the example of a selected memory cell.

Please refer to FIG. 8A. When the set action is performed, the word line $WL_1$ receives the on voltage $V_{ON}$, the word line $WL_2$ receives the off voltage $V_{OFF}$, the program line PL receives the set voltage $V_{SET}$, the bit line $BL_1$ receives the ground voltage $G_{ND}$, and the bit line $BL_2$ receives the inhibit voltage $V_{INH}$. Consequently, the resistive memory cell c11 is the selected memory cell, and the other resistive memory cell c12, c21 and c22 are the unselected memory cells. The magnitude of the set voltage $V_{SET}$ is higher than the magnitude of the on voltage $V_{ON}$. The magnitude of the inhibit voltage $V_{INH}$ is higher than the magnitude of the on voltage $V_{ON}$. The magnitude of the on voltage $V_{ON}$ is higher than the magnitude of the ground voltage GND. The magnitude of the inhibit voltage $V_{INH}$ is higher than the magnitude of the ground voltage GND.

In the unselected memory cells c12 and c22 of the cell array structure 600, the transistors receive the off voltage $V_{OFF}$, and thus the transistors are turned off. Consequently, the unselected memory cells c12 and c22 cannot undergo the set action. In the unselected memory cell c21 of the cell array structure 600, the transistor is turned on. However, the voltage difference between the two terminals of the capacitor C (i.e., $V_{SET}-V_{INH}$) is lower than the magnitude of the set voltage $V_{SET}$. Consequently, the unselected memory cell c21 cannot undergo the set action.

In the selected memory cell c11 of the cell array structure 600, the transistor T receives the on voltage $V_{ON}$, and thus the transistor T is turned on. In addition, the voltage difference between the two terminals of the capacitor C is equal to the set voltage $V_{SET}$ with a first polarity. That is, the voltage difference between the two terminals of the capacitor C is equal to the positive set voltage $+V_{SET}$. Consequently, the conducting filament in the insulation layer of the capacitor C is connected between the two terminals of the capacitor C. Meanwhile, the set action is completed.

Please refer to FIG. 8B. When the reset action is performed, the word line $WL_1$ receives the on voltage $V_{ON}$, the word line $WL_2$ receives the off voltage $V_{OFF}$, the program line PL receives the ground voltage GND, the bit line $BL_1$ receives the reset voltage $V_{RESET}$, and the bit line $BL_2$ receives the ground voltage GND. Consequently, the resistive memory cell c11 is the selected memory cell, and the other resistive memory cell c12, c21 and c22 are the unselected memory cells. The magnitude of the reset voltage $V_{RESET}$ is lower than the magnitude of the on voltage $V_{ON}$.

In the unselected memory cells c12 and c22 of the cell array structure 600, the transistors receive the off voltage $V_{OFF}$, and thus the transistors are turned off. Consequently, the unselected memory cells c12 and c22 cannot undergo the reset action. In the unselected memory cell c21 of the cell array structure 600, the transistor is turned on. However, the voltage difference between the two terminals of the capacitor C is zero (i.e., $V_{BL2}=V_{PL}=GND$) which is lower than the magnitude of the reset voltage $V_{RESET}$. Consequently, the unselected memory cell c21 cannot undergo the reset action.

In the selected memory cell c11 of the cell array structure 600, the transistor T receives the on voltage $V_{ON}$, and thus the transistor T is turned on. In addition, the voltage difference between the two terminals of the capacitor C is the reset voltage $V_{RESET}$ with a second polarity. That is, the voltage difference between the two terminals of the capacitor C is equal to the negative reset voltage $-V_{RESET}$. Consequently, the conducting filament in the insulation layer of the capacitor C is not connected with the two terminals of the capacitor C. Meanwhile, the reset action is completed.

As mentioned above, the resistive memory cell of the second embodiment comprises one N-type transistor and one N-type MOS capacitor. In other words, the resistive memory cell of the second embodiment can be referred as a 1T1C cell.

Figure 9:
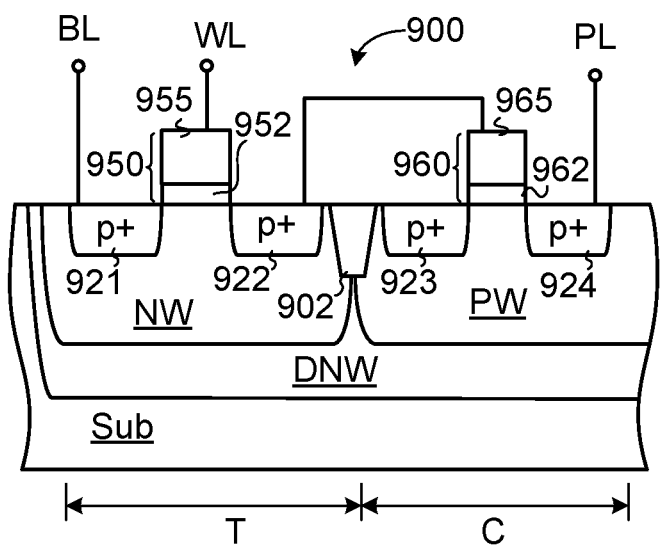
FIG. 9 is a schematic cross-sectional view illustrating a resistive memory cell according to a third embodiment of the present invention.

FIG. 9 is a schematic cross-sectional view illustrating a resistive memory cell according to a third embodiment of the present invention. The program line of the resistive memory cell of the third embodiment is directly connected with the P-type merged region.

As shown in FIG. 9, an isolation structure 902, a deep N-type well region DNW, an N-well region NW, a P-type well region PW are formed in the semiconductor substrate Sub. The isolation structure 902, the N-type well region NW, the P-type well region PW are formed in the deep N-type well region DNW. The N-type well region NW and the P-type well region PW are located beside two opposite sides of the isolation structure 902. For example, the isolation structure 902 is a shallow trench isolation structure (STI). The deep N-type well region DWN and the N-type well region NW are N-type semiconductors. That is, the deep N-type well region DNW and the N-type well region NW are electrically connected with each other.

The first gate structure 950 is located over the surface of the N-type well region NW. The second gate structure 960 is located over the surface of the P-type well region PW. The first gate structure 950 comprises an insulation layer 952 and a conductive layer 955. The second gate structure 960 comprises an insulation layer 962 and a conductive layer 965.

In this embodiment, each of the insulation layer 962 and the conductive layer 965 of the second gate structure 960 is a stack structure with plural material layers. For example, the insulation layer 962 is a stack structure with a silicon dioxide layer ($SiO_2$) and a hafnium dioxide layer ($HfO_2$), and the conductive layer 965 is a stack structure with a titanium layer (Ti), a titanium nitride layer (TiN) and a tungsten layer (W). The hafnium dioxide layer ($HfO_2$) is a high dielectric constant (high-k) material layer, which is suitable for the resistive memory. The silicon dioxide layer ($SiO_2$) is located over the surface of the P-type well region PW. The hafnium dioxide layer ($HfO_2$) is located over the silicon dioxide layer ($SiO_2$). The titanium layer (Ti) is located over the hafnium dioxide layer ($HfO_2$). The titanium layer (TiN) is located over the titanium layer (Ti). The tungsten layer (W) is located over the titanium nitride layer (TiN).

It is noted that the examples of the material layers of the gate structure are not restricted. That is, the material layers may be modified. For example, in another embodiment, the high high-k material layer in the insulation layer 962 is replaced by a tantalum oxide layer ($Ta_2O_5$). Alternatively, the conductive layer 965 is a stack structure with a titanium layer (Ti) and a tungsten layer (W).

Please refer to FIG. 9 again. After an implantation process is performed, a first doped region 921 and a second doped region 922 are formed under the exposed surface of the N-type well region NW, and a third doped region 923 and a fourth doped region 924 are formed in the exposed surface of the P-type well region PW. The first doped region 921 and the second doped region 922 are P-type doped regions (p+). Moreover, the first doped region 921 and the second doped region 922 are located beside two opposite sides of the first gate structure 950. The third doped region 923 and the fourth doped region 924 are P-type doped regions (p+). Moreover, the third doped region 923 and the fourth doped region 924 are located beside two opposite sides of the second gate structure 960. That is, the first gate structure 950 is formed over the surface of the N-type well region NW between the first doped region 921 and the second doped region 922, and the second gate structure 960 is formed over the surface of the P-well region PW between the third doped region 923 and the fourth doped region 924.

Then, a connection process is performed. That is, a first conductor line is connected with the first doped region 921, a second conductor line is connected with the conductive layer 955 of the first gate structure 950, a third conductor line is connected with the second doped region 922 and the conductive layer 965 of the second gate structure 960, and a fourth conductor line is connected with the fourth doped region 924. Consequently, the resistive memory cell 900 is produced. The first conductor line is a bit line BL of the resistive memory cell 900. The second conductor line is a word line WL of the resistive memory cell 900. The fourth conductor line is a program line PL of the resistive memory cell 900.

In the N-type well region NW, the first doped region 921, the second doped region 922 and the first gate structure 950 are collaboratively formed as a transistor T. Since the third doped region 923, the fourth doped region 924 and the P-type well region PW are P-type semiconductors, the third doped region 923 and the fourth doped region 924 and the P-type well region PW are electrically connected with each other and formed as a P-type merged region. In other words, the P-type merged region and the second gate structure 960 are formed as a capacitor C. Since the resistive memory cell 900 comprises one transistor and one capacitor, the resistive memory cell 900 can be referred as a 1T1C cell. Moreover, the transistor T is a P-type transistor, the capacitor C is a P-type MOS capacitor, and the program line PL is directly connected with the P-type merged region.

In the third embodiment, the program line PL is connected with the fourth doped region 924. It is noted that numerous modifications and alterations may be made while retaining the teachings of the invention. For example, in some other embodiments, the program line PL is connected with the third doped region 923, or the program line PL is connected with the P-type well region PW. Consequently, the purpose of connecting the program line PL with the P-type merged region can be achieved. Similarly, plural resistive memory cells of the third embodiment can be combined as a cell array structure. The architecture of the cell array structure is similar to that of FIG. 6B, and not redundantly described herein.

From the above descriptions, the present invention provides a resistive memory cell and an associated cell array structure. The program line PL is directly connected with the N-type merged region or the P-type merged region. Consequently, the voltage from the program line PL is received by the N-type merged region or the P-type merged region.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cell array structure comprising a first resistive memory cell, the first resistive memory cell comprising:
   a semiconductor substrate;
   a first-type well region formed under a surface of the semiconductor substrate;
   a first isolation structure formed in the first-type well region;
   a second-type well region formed in the first-type well region, wherein the second-type well region is located beside a first side of the first isolation structure;
   a first gate structure formed over a surface of the first-type well region and located beside a second side of the first isolation structure;
   a second gate structure formed over a surface of the second-type well region;
   a first second-type doped region and a second second-type doped region formed in the first-type well region, wherein the first second-type doped region and the second second-type doped region are located beside two opposite sides of the first gate structure;
   a third second-type doped region and a fourth second-type doped region formed in the second-type well region, wherein the third second-type doped region and the fourth second-type doped region are located beside two opposite sides of the second gate structure, wherein the third second-type doped region, the fourth second-type doped region and the second-type well region are collaboratively formed as a second-type merged region;
   a first conductor line connected with the first second-type doped region;
   a second conductor line connected with a conductive layer of the first gate structure;
   a third conductor line connected with the second second-type doped region and a conductive layer of the second gate structure; and
   a fourth conductor line connected with the second-type merged region.

2. The cell array structure as claimed in claim 1, wherein the first-type well region is a P-type well region, the second-type well region is an N-type well region, the first second-type doped region is a first N-type doped region, the second second-type doped region is a second N-type doped region, the third second-type doped region is a third N-type doped region, the fourth second-type doped region is a fourth N-type doped region, and the second-type merged region is an N-type merged region.

3. The cell array structure as claimed in claim 1, wherein the first conductor line is a first bit line, the second conductor line is a first word line, and the fourth conductor line is a program line.

4. The cell array structure as claimed in claim 3, wherein the program line is connected with the fourth second-type doped region.

5. The cell array structure as claimed in claim 3, wherein the cell array structure further comprises a second resistive memory cell, and the second resistive memory cell comprises:
   a third gate structure formed over the surface of the first-type well region and located beside the second side of the first isolation structure;
   a fourth gate structure formed over the surface of the second-type well region;
   a fifth second-type doped region and a sixth second-type doped region formed in the first-type well region, wherein the fifth second-type doped region and the sixth second-type doped region are located beside two opposite sides of the third gate structure;
   a seventh second-type doped region and an eighth second-type doped region formed in the second-type well region, wherein the seventh second-type doped region and the eighth second-type doped region are located beside two opposite sides of the fourth gate structure, wherein the second-type merged region further comprises the seventh second-type doped region and the eighth second-type doped region;
   a fifth conductor line connected with the fifth second-type doped region;
   the second conductor line connected with a conductive layer of the third gate structure; and
   a sixth conductor line connected with the sixth second-type doped region and a conductive layer of the fourth gate structure.

6. The cell array structure as claimed in claim 5, wherein the fifth conductor line is a second bit line.

7. The cell array structure as claimed in claim 3, wherein the cell array structure further comprises a second resistive memory cell, and the second resistive memory cell comprises:
   a second isolation structure formed in the first-type well region, wherein the second-type well region is arranged between the first side of the first isolation structure and a first side of the second isolation structure;
   a third gate structure formed over the surface of the first-type well region and located beside a second side of the second isolation structure;
   a fourth gate structure formed over the surface of the second-type well region;
   a fifth second-type doped region and a sixth second-type doped region formed in the first-type well region, wherein the fifth second-type doped region and the sixth second-type doped region are located beside two opposite sides of the third gate structure;

a seventh second-type doped region formed in the second-type well region, wherein the fourth second-type doped region and the seventh second-type doped region are located beside two opposite sides of the fourth gate structure, wherein the second-type merged region further comprises the seventh second-type doped region;

the first conductor line connected with the fifth second-type doped region;

a fifth conductor line connected with a conductive layer of the third gate structure; and a sixth conductor line connected with the sixth second-type doped region and a conductive layer of the fourth gate structure.

8. The cell array structure as claimed in claim 7, wherein the fifth conductor line is a second word line.

9. The cell array structure as claimed in claim 1, wherein the first-type well region comprises a deep N-type well region and an N-type well region, and the second-type well region is a P-type well region, wherein the N-type well region, the P-type well region and the first isolation structure are formed in the deep N-type well region, and the N-type well region and the P-type well region are located beside two opposite sides of the first isolation structure, wherein the first second-type doped region is a first P-type doped region, the second second-type doped region is a second P-type doped region, the third second-type doped region is a third P-type doped region, the fourth second-type doped region is a fourth P-type doped region, and the second-type merged region is a P-type merged region.

10. The cell array structure as claimed in claim 9, wherein the first conductor line is a first bit line, the second conductor line is a first word line, the fourth conductor line is a program line.

11. The cell array structure as claimed in claim 10, wherein the program line is connected with the fourth second-type doped region.

12. The cell array structure as claimed in claim 1, wherein the second gate structure comprises an insulation layer and the conductive layer, wherein the insulation layer is formed on the surface of the second-type well region, the conductive layer is formed over the insulation layer, and the insulation layer comprises a high dielectric constant material layer.

13. The cell array structure as claimed in claim 12, wherein the high dielectric constant material layer is a hafnium dioxide layer ($HfO_2$) layer or a tantalum oxide layer ($Ta_2O_5$) layer.

* * * * *